United States Patent
Wick et al.

(10) Patent No.: US 10,697,531 B2
(45) Date of Patent: Jun. 30, 2020

(54) VIBRATION DAMPING DEVICE

(71) Applicant: Vibracoustic GmbH, Darmstadt (DE)

(72) Inventors: Alexander Wick, Heitersheim (DE);
Peter Wohlschlegel, Kandern (DE);
Peter Fassbinder, Emmendingen (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 587 days.

(21) Appl. No.: 14/951,578

(22) Filed: Nov. 25, 2015

(65) Prior Publication Data
US 2016/0153542 A1 Jun. 2, 2016

(30) Foreign Application Priority Data
Nov. 28, 2014 (DE) .................. 10 2014 117 543

(51) Int. Cl.
*F16H 55/36* (2006.01)

(52) U.S. Cl.
CPC ....... *F16H 55/36* (2013.01); *F16H 2055/366* (2013.01)

(58) Field of Classification Search
CPC .. F16H 55/36; F16H 2055/366; F16D 41/206; F16D 3/12; F02B 67/06
USPC ................................. 474/94, 70
See application file for complete search history.

(56) References Cited

U.S. PATENT DOCUMENTS

| | | | | | |
|---|---|---|---|---|---|
| 3,524,359 | A | * | 8/1970 | Buchwald | F01L 1/024 474/94 |
| 4,355,990 | A | * | 10/1982 | Duncan, Jr. | F16D 3/68 464/74 |
| 5,637,041 | A | * | 6/1997 | Hamaekers | F16D 3/76 464/90 |
| 5,788,576 | A | * | 8/1998 | Varin | F16D 3/02 464/160 |
| 6,106,421 | A | * | 8/2000 | Graber | F16F 15/126 474/94 |
| 6,702,681 | B1 | * | 3/2004 | Ochs | F16D 3/76 464/7 |
| 7,204,772 | B2 | * | 4/2007 | Huber | F16D 3/68 474/94 |
| 7,300,372 | B2 | * | 11/2007 | Riu | F16F 15/126 464/90 |
| 7,591,357 | B2 | * | 9/2009 | Antchak | F16D 41/206 192/41 S |
| 7,618,337 | B2 | * | 11/2009 | Jansen | F02B 67/06 192/41 S |
| 7,624,852 | B2 | * | 12/2009 | Mevissen | F16D 7/022 192/41 S |
| 7,798,928 | B2 | * | 9/2010 | Serkh | F02B 67/06 474/70 |

(Continued)

FOREIGN PATENT DOCUMENTS

CN    1856664 A    11/2006
CN    101076934 A   11/2007
(Continued)

*Primary Examiner* — Henry Y Liu
(74) *Attorney, Agent, or Firm* — Leydig, Voit & Mayer, Ltd.

(57) ABSTRACT

A vibration damping device for a belt drive of an internal combustion engine includes a belt pulley, a hub and a decoupling device. The decoupling device connects the belt pulley and the hub to each other, and has at least two spring members. The spring members can be connected in series.

15 Claims, 3 Drawing Sheets

(56) References Cited

U.S. PATENT DOCUMENTS

| | | | | |
|---|---|---|---|---|
| 7,891,475 | B2 * | 2/2011 | Zhu | F16D 41/22 192/54.5 |
| 7,892,124 | B2 * | 2/2011 | Hodjat | F16D 3/02 192/212 |
| 7,975,821 | B2 * | 7/2011 | Antchak | F16D 43/211 192/55.1 |
| 7,998,008 | B2 * | 8/2011 | Kamdem | F16D 41/206 474/94 |
| 8,006,819 | B2 * | 8/2011 | Dell | F16F 15/1232 192/104 C |
| 8,021,253 | B2 * | 9/2011 | Dell | F16D 3/02 474/74 |
| 8,231,488 | B2 * | 7/2012 | Amati | H02K 7/1012 474/166 |
| 8,262,520 | B2 * | 9/2012 | Shimamura | F16D 3/76 464/71 |
| 8,302,753 | B2 * | 11/2012 | Antchak | F16D 41/206 192/113.32 |
| 8,313,400 | B2 * | 11/2012 | Serkh | F16H 55/36 464/89 |
| 8,506,434 | B2 * | 8/2013 | Harvey | F16D 47/02 192/41 R |
| 8,641,563 | B2 * | 2/2014 | Mende | F16F 15/1297 464/67.1 |
| 8,894,532 | B2 | 11/2014 | Ziemer | |
| 8,944,947 | B2 * | 2/2015 | Yamatani | F02N 15/023 474/166 |
| 8,985,293 | B2 * | 3/2015 | Marion | F16D 13/76 192/113.32 |
| 9,291,253 | B1 * | 3/2016 | Serkh | F16D 41/206 |
| 9,528,589 | B2 * | 12/2016 | Chang | F02B 67/06 |
| 9,599,200 | B2 * | 3/2017 | Agnitch | F16H 7/18 |
| 9,850,997 | B2 * | 12/2017 | Cariccia | F16F 15/1216 |
| 9,982,769 | B2 * | 5/2018 | Hauck | F16F 15/12306 |
| 2005/0215366 | A1 * | 9/2005 | Serkh | F02B 67/06 474/74 |
| 2005/0250607 | A1 * | 11/2005 | Jansen | F02B 67/06 474/74 |
| 2006/0122014 | A1 * | 6/2006 | Kamdem | F16D 3/02 474/70 |
| 2006/0144664 | A1 * | 7/2006 | Antchak | F16D 41/206 192/41 S |
| 2007/0066426 | A1 * | 3/2007 | Kamdem | F16D 41/206 474/94 |
| 2009/0107791 | A1 * | 4/2009 | Zhu | F16D 41/22 192/70.14 |
| 2013/0037370 | A1 * | 2/2013 | Marion | F16D 13/76 192/55.5 |

FOREIGN PATENT DOCUMENTS

| | | |
|---|---|---|
| CN | 101208534 A | 6/2008 |
| CN | 102449339 A | 5/2012 |
| CN | 203413096 U | 1/2014 |
| DE | 4328613 A1 | 3/1995 |
| DE | 4430393 C1 | 9/1995 |
| DE | 19749761 C2 | 6/1999 |
| DE | 102004035969 A1 | 2/2006 |
| DE | 102013111271 A1 | 4/2015 |
| WO | WO 2005028899 A1 | 3/2005 |
| WO | WO 2011127898 A1 | 10/2011 |

* cited by examiner

VIBRATION DAMPING DEVICE

CROSS-REFERENCE TO PRIOR APPLICATION

Priority is claimed to German Patent Application No. DE 10 2014 117 543.3, filed on Nov. 28, 2014, the entire disclosure of which is hereby incorporated by reference herein.

FIELD

The present invention relates to a vibration damping device, in particular a decoupled belt pulley, for a belt drive of an internal combustion engine with a hub and a belt pulley, the belt pulley and the hub being connected to each other via a decoupling device.

BACKGROUND

In motor vehicles with an internal combustion engine, auxiliary units, such as an air conditioning compressor or a generator, are driven via the crankshaft. By means of a vibration damping device of the type mentioned in the introduction, the rotary movement of the crankshaft is then transferred onto the auxiliary unit via a belt drive.

Due to the rotational irregularities of the crankshaft, vibrations are introduced into the belt drive. In order to isolate these vibrations, a decoupling device is disposed between the hub and the belt pulley. Such vibration dampers are also referred to as decoupled belt pulleys or decoupled torsional vibration dampers. The torsional rigidity of such a decoupling device is most frequently selected in such a way that the first excited natural torsional frequency of the system auxiliary unit-drive pulley is sufficiently below the idling speed of the internal combustion engine.

One example for a vibration damping device with a decoupling device is apparent from DE 197 49 761 C2. The decoupling device is configured as a soft elastomer spring that connects the hub and the belt pulley with each other. In this case, the elastomer spring decouples, or isolates, the vibrations acting from the crankshaft on the belt pulley.

The lower the damping effect of the decoupling device can be set, the more effective the decoupling effect of the decoupling device is in the speed range of the internal combustion engine. However, this is disadvantageous particularly in internal combustion engines with a start-stop system because it is necessary to pass through the first resonance of the system auxiliary unit-belt pulley during each start-stop process of the internal combustion engine. Thus, the decoupling device which, due to its function, is soft and low-damping, is subjected to very large resonance amplitudes. The coupled masses of the belt drive are often incapable of following them, so that there is an occurrence of belt slip in conjunction with unacceptable noise and belt wear.

To avoid these drawbacks, DE 10 2004 035 969 A1 describes a vibration damping device with a decoupling device comprising an elastomer spring and a freewheel member connected in series therewith.

SUMMARY

In an embodiment, the present invention provides a vibration damping device for a belt drive of an internal combustion engine. The vibration damping device includes a belt pulley, a hub and a decoupling device. The decoupling device connects the belt pulley and the hub to each other, and has at least two spring members. The spring members can be connected in series.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
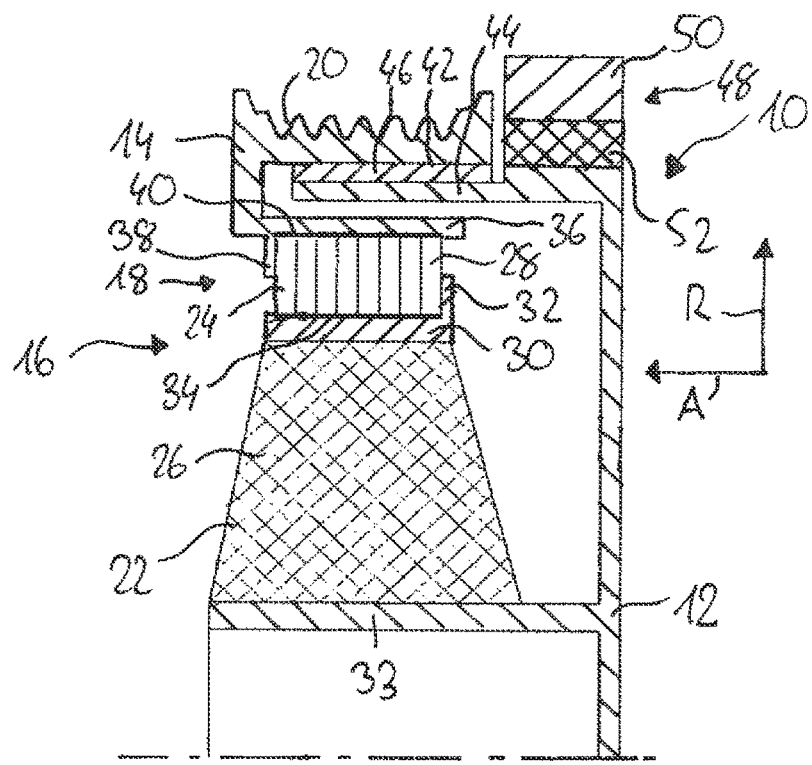
FIG. 1 shows a cross section through a first embodiment of a vibration damping device.

In modern internal combustion engines, the trend runs to a reduction of the idling speed and, at the same time, a removal of the mass inertia from the belt drive. For this purpose, the natural resonance of the coupling device should be lower than the natural resonance of the idling speed of the engine. However, this can be achieved only to a limited extent with vibration damping devices known from the prior art.

In an embodiment, the present invention provides a vibration damping device of the type mentioned in the introduction, which ensures an improved decoupling of the engine vibrations at reduced idling speeds.

In an embodiment, the decoupling device has at least two spring members. It was found, according to the invention, that two spring members, in particular two soft spring members, reduce the rigidity of the vibration damping device. Thus, the vibration damping device has a reduced natural resonance, so that the natural resonance of the vibration damping device is significantly lower than the main excitation order of the engine and thus differs sufficiently from the idling speed. Consequently, the engine vibrations are isolated, or decoupled, even in the case of reduced idling speeds. Furthermore, small resonance amplitudes occur during every start and stop process of the internal combustion engine when passing the first resonance of the system auxiliary aggregate-belt drive, so that the coupled masses of the belt drive are now capable of following them. Belt slip is thus prevented, and as a consequence, belt wear is reduced. In addition, the generation of unacceptable noise is prevented.

In an advantageous embodiment, the spring members are connected in series. Advantageously, the series-connected spring members are configured to be soft. The sum of the quotients of the individual spring rigidities yields the rigidity of the decoupling device. This makes a significantly lower natural resonance of the decoupling device, and thus of the vibration damping device, possible.

In an advantageous embodiment, the spring members are configured in such a way that their natural resonance is below the exciter assembly of the idling internal combustion engine. Advantageously, the natural resonance is significantly below the exciter assembly of the idling internal combustion engine. Preferably, the spring members are formed from two soft spring members. Advantageously, this is achieved with two series-connected soft spring members.

In an advantageous embodiment, the hub is associated with a torsional vibration damper, which has an inertia ring and an elastomer body, wherein the inertia ring is connected to the hub via the elastomer body. Advantageously, the spring members of the decoupling device have a lower rigidity than the elastomer body of the torsional vibration damper. Advantageously, each of the spring members of the decoupling device has a rigidity between about 1 Nm/° and 10 Nm/°, preferably between about 2 Nm/° and 7 Nm/°. In comparison, the elastomer spring of the torsional vibration damper has a rigidity of between about 200 Nm/° and about 600 Nm/°. Since the natural resonance of the decoupling device, in particular of the two series-connected spring members, is below the exciter assembly of the idling internal combustion engine, the ageing of the elastomer body of the torsional vibration damper is compensated. Thus, the vibration damping device has a longer life.

In an advantageous embodiment, a connecting member is disposed between the at least two spring members, the connecting member having at least one attachment portion for attaching one of the spring members to the hub. Advantageously, both spring members are connected to the connecting member. The spring members can be connected to the connecting member by force fit, positive fit and/or by substance-to-substance connection. Advantageously, the connecting member is configured as a sleeve. A connecting member configured as a sleeve is inexpensive to produce. Advantageously, the attachment portion is configured as an appendage protruding radially inwards and/or radially outwards from the connecting member.

Advantageously, one of the spring members abuts against an appendage of the belt pulley extending in the axial direction, the appendage having at least one attachment portion for attaching the abutting spring member to the belt pulley. Advantageously, the attachment portion is configured as a leg protruding radially inwards and/or radially outwards from the appendage. Advantageously, the spring member is connected to the attachment portion by force fit, positive fit and/or by substance-to-substance connection.

Advantageously, the spring members are configured as elastomer springs or metal springs. Furthermore, the coupling device may have at least one elastomer spring and at least one metal spring. A spring member configured as an elastomer spring can be vulcanized on to the hub, the connecting member, in particular the attachment portion thereof, and/or the appendage of the belt pulley protruding in the axial direction, in particular the attachment portion thereof. A spring member configured as a metal spring is advantageously connected to the hub, the connecting member, in particular the attachment portion thereof, and/or the appendage of the belt pulley protruding in the axial direction, in particular the attachment portion thereof, by force fit and/or by substance-to-substance connection.

Advantageously, hardened countertracks are associated with the decoupling device. Also advantageously, hardened countertracks are associated with at least one of the spring members. Advantageously, the connecting member has a first hardened countertrack, and the appendage of the belt pulley extending in the axial direction has a second hardened countertrack. Furthermore, an insert with a hardened surface may be provided in each case between the spring member and the connecting member and/or the appendage of the belt pulley extending in the axial direction. Advantageously, the hardened countertracks serve as tracks for a metal spring with a freewheel function and/or a freewheel member.

In an advantageous embodiment, the belt pulley is mounted on the hub via a bearing member. The bearing member can be configured as a plain bearing or as a ball bearing. A low-friction movement of the belt pulley relative to the hub is thus realized. Signs of wear are thus reduced to a great extent.

In an advantageous embodiment, the decoupling device comprises a freewheel member connected in series with the spring members. The freewheel member can be disposed downstream of the decoupling device in the radial direction or be disposed between the two spring members. The freewheel member improves the vibration decoupling of the vibration damping device because the freewheel member causes an idling state in one direction, which prevents a transmission of vibrations. In addition, the freewheel function enables a decoupling of the belt plane or of the belt drive during stationary operation. Thus, the vibration damping device according to the invention can be used in all engine-related applications for which there is a desire to introduce a starting torque into the crankshaft via a belt drive and to interrupt the transmission between the drive end and the belt drive during operation with a stationary rotational speed. Furthermore, the spring members decouple the vibrations on the freewheel unit introduced by the internal combustion engine during engine operation. The operating behavior of the freewheel unit is thus improved because the vibrations and accelerations acting upon it, which could lead to a malfunction of the freewheel unit, are reduced.

Thus, the soft spring members enable a soft connection of the freewheel unit to the freely vibrating end of a crankshaft of an internal combustion engine. In addition, the spring members improve the durability and the acoustics of the freewheel unit. Accordingly, the static and dynamic stresses on the freewheel structure during operation are improved by the soft spring members. Advantageously, the freewheel member is associated with hardened countertracks, with a first countertrack being associated with the vibration damping device and a second countertrack being associated with one of the spring members. Advantageously, a connecting member against which the second countertrack abuts is disposed between the freewheel member and one of the spring members. Also preferably, the first countertrack is disposed on an appendage of the belt pulley extending in the axial direction.

In an advantageous embodiment, the freewheel unit is configured as a clamping body freewheel unit or clamping roller freewheel unit. The clamping body freewheel unit ensures a high level of protection against slipping. The clamping roller freewheel unit is quiet, wear-resistant and tried and tested in the motor vehicle sector.

FIG. 1 shows a vibration damping device 10 according to a first embodiment for transferring a rotary movement of a crankshaft onto an auxiliary unit via a belt drive.

The vibration damping device 10 has a hub 12, a belt pulley 14 and a decoupling device 16. The hub 12 and the belt pulley 14 are disposed concentrically with one another, with the belt pulley 14 surrounding the hub 12 radially on the circumference, forming a gap 18. The belt pulley 14 has a V-shaped profile 20 for accommodating a belt or belt drive. The hub 12 serves for linking the vibration damping device 10 to a drive end of the internal combustion engine, such as a crankshaft.

The decoupling device 16 is disposed within the gap 18 and connects the hub 12 and the belt pulley 14 with each other in a torsionally flexible manner. The decoupling device 16 has a first spring member 22 and a second spring member 24, with the two spring members 22, 24 being connected in series.

The first spring member 22 is configured as an elastomer spring 26, and the second spring member 24 is configured as a metal spring 28 having a freewheel function. A connecting member 30, which has an attachment portion 32 protruding outwards in the radial direction R, is disposed between the two spring members 22, 24. In the present case, the connecting member 30 is configured as a sleeve.

The elastomer spring 26 is connected to the hub 12 and the connecting member 30 by substance-to-substance connection. In particular, the elastomer spring 26 is vulcanized on to an outer surface of a first leg 33 of the hub 12 extending in the axial direction A and to an inner surface of the connecting member 30. The metal spring 28 is connected to the attachment portion 32 of the connecting member 30 by a substance-to-substance connection and/or by force fit. The metal spring 28 is thus linked to the hub 12.

On its outer surface, the connecting member 30 has a first hardened countertrack 34 associated with the metal spring 28 in order to ensure a track for its freewheel function.

The belt pulley 14 has an appendage 36, which extends in the axial direction A and against which the metal spring 28 abuts. The appendage 36 comprises an attachment portion 28 protruding radially inwards from the appendage 36. The metal spring 28 is connected to the attachment portion 38 of the appendage 36 by force fit and/or by substance-to-substance connection. The metal spring 28 is linked to the belt pulley 14 via the appendage 36. Furthermore, the appendage 36 has, on an inner surface, a second hardened countertrack 40 that serves as a track for the freewheel function of the metal spring 28.

The belt pulley 14 is supported via a bearing member 42 on a second leg 44 of the hub 12 protruding in the axial direction A. In the present case, the bearing member 42 is configured as a slide bearing 46. The bearing member 42 may also be configured as a rolling bearing.

Furthermore, the hub 12 comprises a torsional vibration damper 48 having an inertia ring 50, which is supported on the belt pulley 14, in particular the leg 44 thereof, via an elastomer body 52.

The spring members 22, 24 have a lower rigidity than the elastomer body 52. The spring members 22, 24 have a rigidity between about 1 Nm/° and 10 Nm/°, preferably between about 2 Nm/° and 7 Nm/°. The elastomer body 52 has a rigidity of about 200 Nm/° and to about 600 Nm/°.

Due to the two soft, series-connected spring members 22, 24, the resonance of the vibration damping device 10 is significantly lower than the main excitation order of an internal combustion engine. Thus, the vibration damping device differs sufficiently from the idling speed of the internal combustion engine, so that belt slip and the generation of noise connected therewith is avoided. Furthermore, the ageing of the elastomer body 52 can be compensated.

Figure 2:
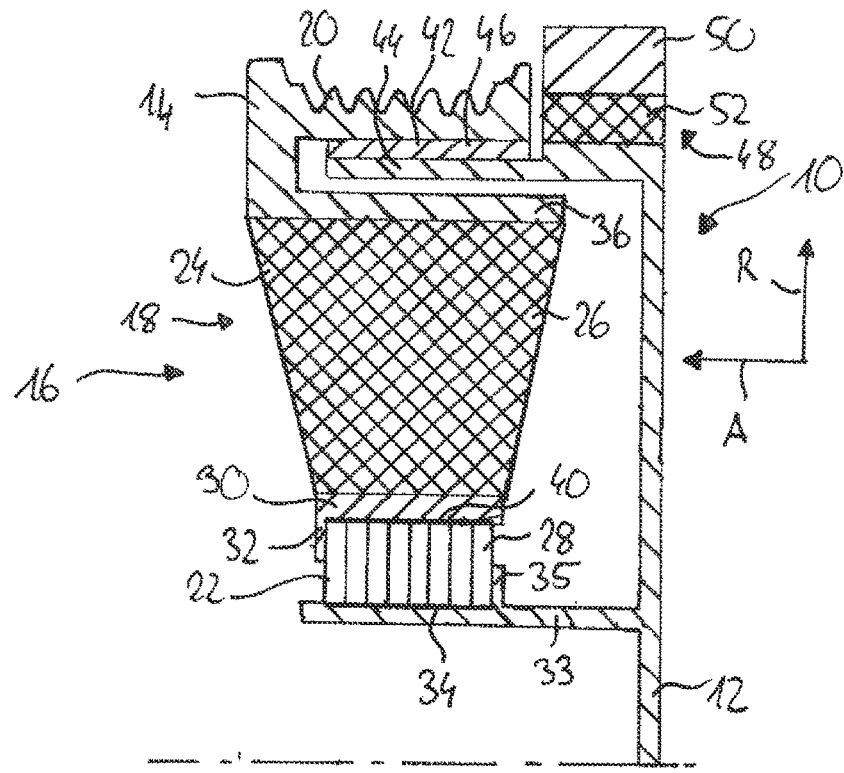
FIG. 2 shows a cross section through a second embodiment of a vibration damping device.

FIG. 2 shows a second embodiment of the vibration damping device 10 that differs from the first embodiment by the reversed arrangement of the two spring members 22, 24. The metal spring 28 is linked by force fit and/or substance-to-substance connection to an attachment portion 35 of the hub 12 protruding radially outwards from the first leg 33, and to the attachment portion 32 of the connecting member 30, which protrudes radially inwards. The hub 12, particularly the outer surface of the first leg 33, has a first hardened countertrack 34 facing towards the metal spring 28, and the connecting member 30 has on its inner surface a second hardened countertrack 40. The elastomer spring 26 is vulcanized on to the connecting member 30 and the appendage 36. In particular, the elastomer spring 26 is vulcanized on to an outer surface of the connecting member 30 and to an inner surface of the appendage 36.

Figure 3:
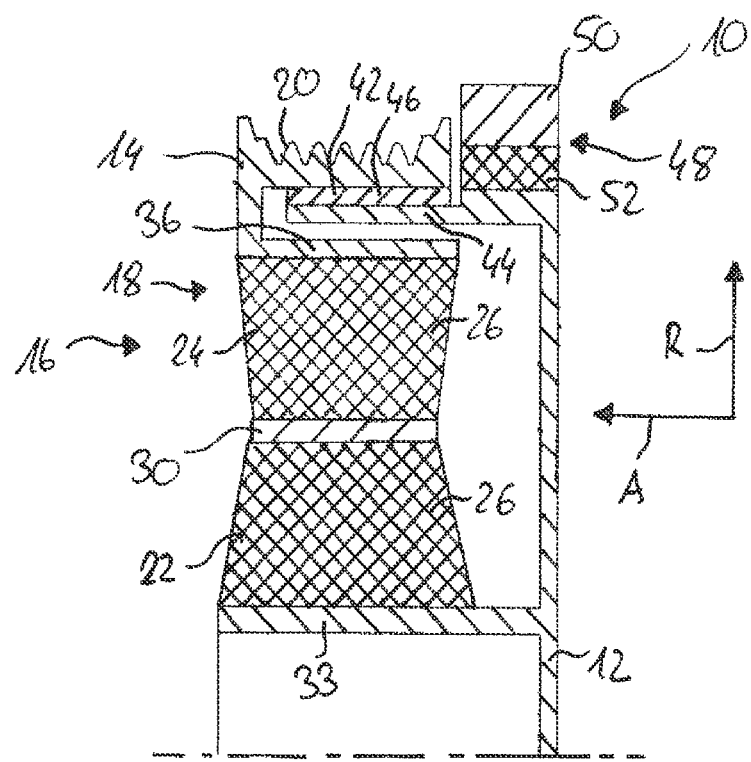
FIG. 3 shows a cross section through a third embodiment of a vibration damping device.

FIG. 3 shows a third embodiment of the vibration damping device 10 that differs from the first two embodiments by both of the two spring members 22, 24 being configured as elastomer springs 26. The spring member 24 is vulcanized on to the connecting member 30, in particular to an outer surface of the connecting member 30, and to the appendage 36, in particular to an inner surface of the appendage 36. Thus, the two attachment portions 32, 38 can be omitted.

Figure 4:
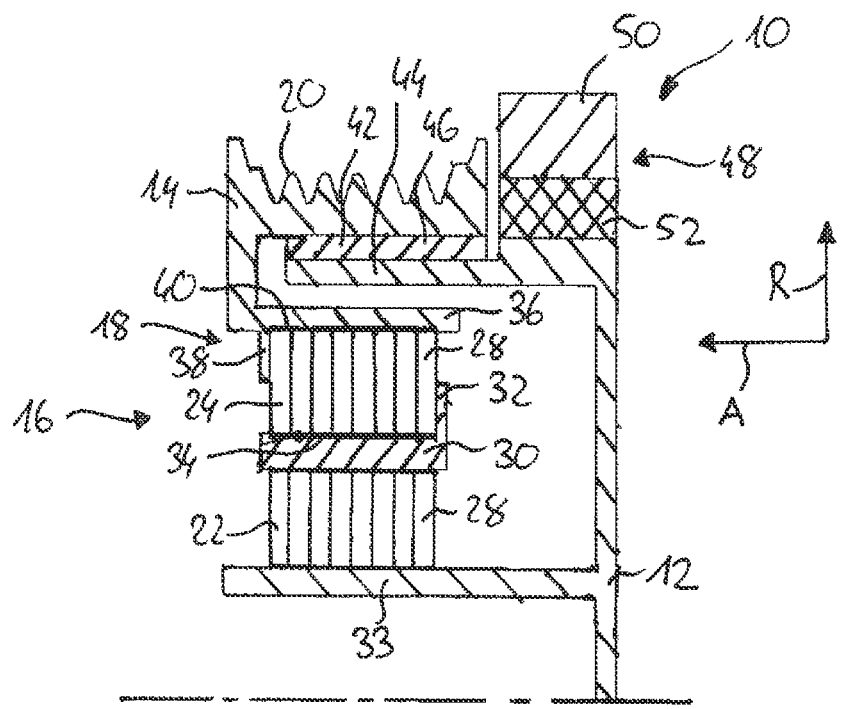
FIG. 4 shows a cross section through a fourth embodiment of a vibration damping device.

FIG. 4 shows a fourth embodiment of the vibration damping device 10 that differs from other embodiments by both of the two spring members 22, 24 being configured as metal springs 28, with the metal spring 28 facing towards the hub 12 not having a freewheel function. The metal spring 28 facing towards the hub 12 is connected to the hub 12 and the connecting member 30 by force fit and/or by substance-to-substance connection. In particular, the metal spring 28 facing towards the hub 12 is connected to an outer surface of the first leg 33 and an inner surface of the connecting member 30 by force fit and/or by substance-to-substance connection.

Figure 5:
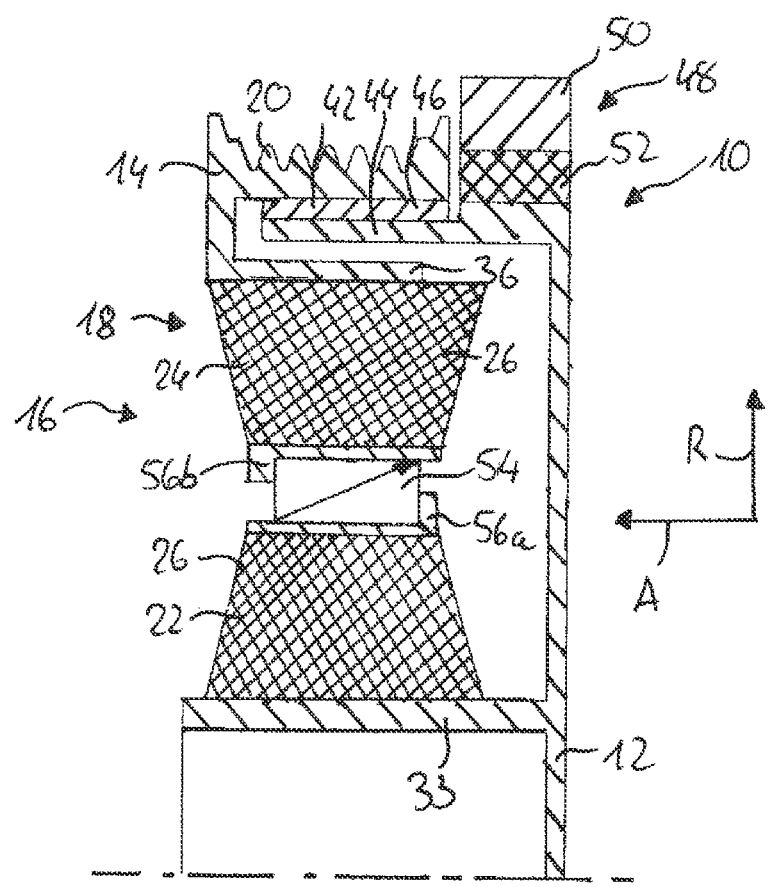
FIG. 5 shows a cross section through a fifth embodiment of a vibration damping device.

FIG. 5 shows a fifth embodiment of the vibration damping device 10 that differs from the first four embodiments by the coupling device 16 additionally having a freewheel member 54. In the present case, the two spring members 22, 24 are configured as elastomer springs 26, with the freewheel member 54 being disposed between the two spring members 22, 24. In order to link the freewheel member 54 to the spring members 22, 24, one connecting member 56a, 56b, respectively, is disposed between the spring members 22, 24 and the freewheel member 54, wherein the spring members 22, 24 can be connected to the connecting members 56a, 56b by positive fit, force fit and/or substance-to-substance connection. In the present case, the spring members are vulcanized on to the connecting members 56a, 56b. The connecting members 56a, 56b each have a hardened countertrack associated with the freewheel member.

In an embodiment, the hardened countertracks 34, 40 can be formed on separate inserts.

The vibration damping device 10 is characterized by its decoupling device 16, which connects the hub 12 and the belt pulley 14 with each other, and which is formed from two series-connected, soft spring members 22, 24. Due to the two series-connected, soft spring members 22, 24, the rigidity of the vibration damping device 10 is reduced, so that their resonance is significantly lower than the main excitation order of the engine. Consequently, the vibration damping device 10 differs sufficiently from the idling speed, so that belt slip and the accompanying generation of noise is avoided. At the same time, the ageing of the elastomer body 52 of the torsional vibration damper 48 can be compensated.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS LIST

10 Vibration Damping Device
12 Hub
14 Belt pulley
16 Decoupling device
18 Gap
20 V-shaped profile
22 First spring member
24 Second spring member
26 Elastomer spring
28 Metal spring
30 Connecting member
32 Attachment portion
33 First leg
34 First hardened countertrack
35 Attachment portion
36 Appendage
38 Attachment portion
40 Second hardened countertrack
42 Bearing member
44 Second leg
46 Plain bearing
48 Torsional vibration damper
50 Inertia ring
52 Elastomer body
54 Freewheel member
56a Connecting member
56b Connecting member
R Radial direction
A Axial direction

What is claimed is:

1. A vibration damping device for a belt drive of an internal combustion engine, the vibration damping device comprising:
a belt pulley;
a hub; and
a decoupling device connecting the belt pulley and the hub to each other, the decoupling device having at least two spring members,
wherein the spring members are configured in such a way that a natural resonance of the spring members is below an excitation order of the internal combustion engine in an idle state,
wherein a first one of the spring members is supported on a first leg of the hub protruding in an axial direction,
wherein the belt pulley is supported via a bearing member on a second leg of the hub protruding in the axial direction
wherein a second one of the spring members abuts against an appendage of the belt pulley, the appendage extending in an axial direction and having at least one attachment portion that attaches the second spring member to the belt pulley, and
wherein the spring members are connected in series between the appendage of the belt pulley and the first leg of the hub.

2. The vibration damping device according to claim 1, wherein the hub is associated with a torsional vibration damper, which has an inertia ring and an elastomer body, wherein the inertia ring is connected to the hub via the elastomer body.

3. The vibration damping device according to claim 2, wherein the spring members of the decoupling device have a lower rigidity than the elastomer body of the torsional vibration damper.

4. The vibration damping device according to claim 1, wherein a connecting member is disposed between the spring members, the connecting member having at least one attachment portion that attaches one of the spring members to the hub.

5. The vibration damping device according to claim 1, wherein the spring members are configured as elastomer springs or metal springs.

6. The vibration damping device according to claim 1, wherein the decoupling device has at least one elastomer spring and at least one metal spring.

7. The vibration damping device according to claim 1, further comprising hardened countertracks associated with the decoupling device.

8. The vibration damping device according to claim 1, wherein the bearing member is configured as a plain bearing or as a ball bearing.

9. The vibration damping device according to claim 1, wherein the decoupling device comprises a freewheel member connected in series with the spring members.

10. The vibration damping device according to claim 3, wherein the elastomer body of the torsional vibration damper has a rigidity of between about 200 Nm/° and 600 Nm/°.

11. The vibration damping device according to claim 1, wherein the hub is configured to be operatively coupled to a drive end of the internal combustion engine, and
wherein the vibration damping device is configured to transfer rotary movement of the drive end of the internal combustion engine to the belt drive.

12. The vibration damping device according to claim 1, wherein each of the spring members has a rigidity between about 1 Nm/° and 10 Nm/°.

13. The vibration damping device according to claim 1, wherein the appendage of the belt pulley is rigidly connected to a surface of the belt pulley that operatively engages with an outer surface of the bearing member.

14. The vibration damping device according to claim 1, wherein the first leg of the hub is spaced apart from the second leg of the hub in the radial direction.

15. The vibration damping device according to claim 14, wherein at least a portion of the first leg of the hub is coplanar with a portion of the second leg of the hub in a plane that is perpendicular to the radial direction.

\* \* \* \* \*